United States Patent Office 3,830,845
Patented Aug. 20, 1974

---

3,830,845
PURIFICATION OF 2,4-DIHYDROXY-BENZOPHENONE
Fred S. Arimoto, Newark, Del., and Luke D. Ford, Pennsville, N.J., assignors to E. I. du Pont de Nemours and Company, Wilmington, Del.
No Drawing. Continuation-in-part of abandoned application Ser. No. 702,208, Feb. 1, 1968. This application Oct. 30, 1970, Ser. No. 85,819
Int. Cl. C07c 49/82
U.S. Cl. 260—591  5 Claims

ABSTRACT OF THE DISCLOSURE

Crude 2,4-dihydroxybenzophenone is purified by treating with sodium hydrosulfite in aqueous alkaline medium at a pH of at least about 7.5 and at a temperature of about 70–100° C., precipitating, filtering, washing and drying.

BACKGROUND

This is a continuation-in-part of application Ser. No. 702,208, filed Feb. 1, 1968 and now abandoned.

2,4-Dihydroxybenzophenone is a well-known ultraviolet light absorber and is also used as an intermediate in the preparation of other ultraviolet light absorbers (see U.S. Pat. No. 3,006,959). It is used extensively to stabilize colorless or lightly colored resinous, polymeric and plastic articles, fibers, films and coatings. It is therefore of utmost importance that the 2,4-dihydroxybenzophenone itself be of the highest purity and stability so that it does not darken or discolor the materials it is designed to protect.

In some processes of manufacture, such as those utilizing resorcinol with benzonitrile (French Pat. No. 1,504,132), benzoyl chloride (U.S. Pat. No. 2,773,903) or benzotrichloride as starting materials, the crude 2,4-dihydroxybenzophenone obtained is found to contain small amounts of orange-red impurities. These orange-red impurities were identified as 6-hydroxy-9-phenyl-3H-xanthen-3-one by Doebner in *Annalen* 217, page 234, in the reaction of 1 mole of benzotrichloride with 2 moles of resorcinol at 180° C.–190° C. Cohn in *J. fur Praktiche Chem.* [2] 48, page 387, shows that the same 6-hydroxy-9-phenyl-3H-xanthen-3-one is formed when one part of benzoic acid and two parts of resorcinol and one-half part of zinc chloride are heated at 170° C.–180° C. In addition, Komarowski and V. Kostanecki in *Berichte* 27, page 1998, show that the same 6-hydroxy-9-phenyl-3H-xanthen-3-one is formed when dihydroxybenzophenone is heated with resorcinol in the presence of zinc chloride indicating thereby that in reactions to produce dihydroxybenzophenone the dihydroxybenzophenone produced reacts with the resorcinol to produce the orange-red impurities. Although these dark colored materials generally do not amount to more than a few percent, they are nevertheless present in sufficient quantity to cause undesirable color formation.

Known methods of purification, such as recrystallization from solvents as described in U.S. Pat. No. 2,682,559 and U.S. Pat. No. 2,854,485, do not satisfactorily remove the colored impurities from the crude 2,4-dihydroxybenzophenone. Simple recrystallization from solvents is not sufficient to produce a dihydroxybenzophenone pure enough for use in clear plastics and coatings.

It is accordingly among the objects of this invention to provide a process for the purification of 2,4-dihydroxybenzophenone. A further object is to produce 2,4-dihydroxybenzophenone substantially free of orange-red colored impurities. Other objects will appear hereinafter.

BRIEF SUMMARY OF INVENTION

Removal of orange-red impurities from crude 2,4-dihydroxybenzophenone formed by the reaction of resorcinol with benzoyl chloride, benzonitrile or benzotrichloride is accomplished according to the present invention by treating said crude 2,4-dihydroxybenzophenone with at least about 0.05 parts by weight of sodium hydrosulfite per part of crude in an aqueous alkaline medium having a pH of at least about 7.5 at a temperature in the range of about 70°–100° C. for at least about 10 minutes, isolating (precipitating) the product preferably by cooling or precipitating by neutralization to a pH of 4.0 or less, filtering, washing and drying. The precipitate may be further purified by, before drying, dissolving it in acetone, adding activated carbon, optionally heating, filtering, drowning the filtrate in water to reprecipitate, filtering, washing and drying.

An alternative embodiment includes also adding a metal sequestering agent (ethylenediamine tetraacetic acid tetrasodium salt alone or in admixture with the sodium salt of N,N-di(2-hydroxyethyl) glycine) to the hot aqueous alkaline solution. In this embodiment, it is preferable to wash the precipitate with both a water-wash and with a dilute aqueous solution of a lower aliphatic polybasic carboxylic acid before drying.

DETAILED DESCRIPTION OF INVENTION

It has now been found that the dark-colored, orange-red impurities found in crude 2,4-dihydroxybenzophenone prepared from resorcinol and benzonitrile, benzoyl chloride or benzotrichloride, can be substantially removed from the crude product by first dissolving in an aqueous alkaline solution having a pH of at least 7.5, preferably 8.5–9.0. The alkaline solution may be prepared from sodium hydroxide, sodium carbonate or sodium bicarbonate. About 2 to 25 parts of aqueous alkaline solution per part of 2,4-dihydroxybenzophenone is adequate, the strength being sufficient to provide a pH of at least 7.5. The solution is heated to at least about 70° C., preferably 75°–100° C., and sodium hydrosulfite is added to the solution. While the amount needed will vary with the degree of impurity, about 0.05 to 0.50 part of sodium hydrosulfite per part of crude dihydroxybenzophenone is generally sufficient. The reaction mixture is maintained at 70°–100° C., preferably at 80°–100° C., for about 10–120 minutes (preferably 10–60 minutes) with agitation. The mixture may optionally be carried out under a nitrogen gas atmosphere to minimize oxidation. The purified dihydroxybenzophenone is precipitated by neutralizing to a pH of about 4.0 or less or, preferably, by gradual cooling to about room temperature. The precipitate is then washed with water and dried. The purified product so obtained may be used as an intermediate in the preparation of various benzophenone derivatives, such as ethers (U.S. Pat. No. 3,006,959).

In the purification process of the invention, sodium hydrosulfite reduces the colored impurity to a colorless form. When the purified dihydroxybenzophenone is precipitated by acidification of the reaction mixture, a reduced, colorless form of the impurity is precipitated therewith. Although the dihydroxybenzophenone recovered from the acidified solution is lighter in color, it will darken upon storage or exposure to air, due to the presence of the impurity which will oxidize back to the original colored form.

However, for certain uses, dihydroxybenzophenone recovered in this manner is satisfactory, as, for instance, for use in the preparation of ethers, which are also ultraviolet light absorbers. (U.S. Pat. No. 3,006,959.) These ethers are prepared by the condensation of dihydroxybenzophenone with an alkyl bromide in alkaline medium.

Since the reduced, colorless impurity is soluble in alkali, it is removed from the product in the washing step.

According to the preferred procedure of the invention, dihydroxybenzophenone is precipitated from the reaction mixture by cooling the mixture. The reduced form of the impurity remains in the alkaline mother liquor and pure dihydroxybenzophenone is thereby recovered.

If the 2,4-dihydroxybenzophenone itself is to be used as a UV screener, it is preferable to give it a further treatment which comprises dissolving the above precipitate (before drying) in acetone, adding activated carbon (and optionally heating), filtering, washing the carbon with acetone, drowning the filtrate in water to reprecipitate the 2,4-dihydroxybenzophenone, filtering, washing with water and drying.

In the event metallic substances are present or metal equipment is used in plant manufacture of the 2,4-dihydroxybenzophenone, it is desirable to add a metal sequestering agent as well as sodium hydrosulfite to the hot aqueous alkaline solution to remove traces of metals which may have been acquired during the manufacturing process. The commonly used metal sequestering agents, such as "Versene" (ethylenediamine tetraacetic acid tetrasodium salt) and "Versene" Fe-3 (a mixture of ethylenediamine tetraacetic acid tetrasodium salt and the sodium salt of N,N-di(2-hydroxyethyl) glycine), are convenient. About 0.01 to 0.02 part by weight of the metal sequestering agent per part of crude hydroxybenzophenone is generally sufficient. More may be employed if greater metal contamination is present. In this embodiment, after precipitation, filtering and water-washing, it is preferable to wash the product with a dilute (in the order of about 0.1 to 0.5% being sufficient) aqueous solution of a lower aliphatic polybasic carboxylic acid such as citric or oxalic acid before drying.

EXAMPLES

The following examples describe the invention in further detail. These examples are intended to be merely illustrative of the invention and not in limitation thereof. All parts are by weight unless otherwise indicated.

The purity (i.e., removal of the orange-red impurities) is expressed in percent transmittance of a 10% solution by weight in acetone as measured in a Bausch and Lomb Spectronic 20 Colorimeter at 475 m$\mu$ in optically matched test tubes having a one-half inch internal diameter. A higher degree of transmittance indicates greater purity. The degree of purity desired depends on the intended end use.

EXAMPLE 1

To a sample of 10 parts of crude orange-colored 2,4-dihydroxybenzophenone (prepared from resorcinol and benzonitrile) and 60 parts of water was added 10.6 parts of 30% aqueous NaOH (sodium hydroxide). The mixture was heated to 87° C. Five parts of sodium hydrosulfite was added to the solution and the latter was maintained at 87° C. for an additional 25 minutes. The mixture was then acidified to a pH of 1.7 with 9.4 parts of concentrated HCl and cooled to 35° C. The light-yellow product (9.3 parts) melted at 144°–145° C. and had a 57% transmittance.

EXAMPLE 2

The purified product obtained in Example 1 was given further treatment by dissolving in acetone, adding a small amount of activated carbon, boiling a few minutes and cooling. The carbon was removed by filtration and the filtrate poured into water, precipitating the further purified, 2,4-dihydroxybenzophenone (hereinafter designated DHBP) as a faintly yellow to white product.

EXAMPLE 3

A mixture of 41.8 parts of an aqueous 5% $Na_2CO_3$ solution, 10 parts crude DHBP (5–17% transmittance) and 1 part sodium hydrosulfite was heated to 95° C. and maintained at 95° C. for 10 minutes. To this mixture was added 2 parts activated carbon (Darco) and the mixture was filtered at 95°–100° C. The filtrate was cooled to 25° C., the precipitate filtered, washed and dried. The purified DHBP (3 parts) had a transmittance of 79%. Thus, where DHBP itself is to be used as a UV screener, it is possible if desired to combine the hydrosulfite treatment and the activated carbon purifying treatment.

EXAMPLE 4

228 parts water and 12 parts $Na_2CO_3$ were charged into an enamel kettle. At 80° C., 120 parts crude DHBP (5–17% transmittance) was added, slowly heated to 94° C. and maintained at 94° C. for 15 minutes. 12 parts sodium hydrosulfite was added slowly over a 30-minute period, held at 94° C. for 15 minutes and cooled to about 35° C. The precipitated DHBP was filtered on a suction filter and washed with water. This procedure was repeated with another 120 parts of crude DHBP. The total solids were then dissolved in 192 parts of acetone, decolorized with 10 parts activated carbon (Darco G–60) and filtered. The acetone filtrate was drowned in 960 parts water, the precipitated product collected on a nutsch filter and then dried in a vacuum over at 60°–70° C. The purified DHBP had a melting point of 145°–146° C. and a transmittance of 79%. After 24 hours in a 100° C. oven, the transmittance was still about 79%. The UV spectra (ethanol) was identical to authentic DHBP.

EXAMPLE 5

A mixture of 100 parts crude DHBP (having a transmittance of 25%), 190 parts distilled water and 8 parts sodium carbonate was heated to 96°–98° C. to give a clear solution. Ten parts of sodium hydrosulfite was added and the mixture was held on temperature for 10 minutes. The mixture was cooled to 25°–30° C., filtered and the precipitate was washed with distilled water until free of alkali when tested on Brilliant Yellow paper. Some of the cake (79.6 parts total) was dried at 60° C. and the dried product had a transmittance of 72% while the rest of the cake had a transmittance of 64% after being dried at 100° C.

EXAMPLE 6

A mixture of 50 parts crude DHBP (transmittance of 25%), 95 parts distilled water, and 4 parts sodium carbonate was heated to 96°–98° C. Then 5 parts sodium hydrosulfite was added and the mixture was held on temperature for 10 minutes. The mixture was cooled to 25°–30° C. to crystallize the product which was then filtered and washed with distilled water until free of alkali when tested on Brilliant Yellow paper. The filter cake was dissolved in 51.4 parts acetone, and 0.05 parts activated carbon (Darco G–60) and 0.25 parts diatomaceous earth (Standard Super Cel) were added. After stirring for 10 minutes, the mixture was filtered and the cake was washed with 5.1 parts acetone. The filtrate was drowned into 208 parts distilled water to precipitate the product which was then filtered and washed with 100 parts distilled water. Some of the product (37.9 parts total) was dried at 60° C. and had a transmittance of 93% and the remainder was dried at 100° C. and had a transmittance of 89%.

EXAMPLE 7

A mixture of 50 parts crude DHBP (transmittance of 25%), 95 parts distilled water and 4 parts sodium carbonate was heated to 96°–98° C. over 2 hours to dissolve the DHBP. Then 0.5 part ethylenediamine tetraacetic acid tetrasodium salt and 5 parts sodium hydrosulfite were added, the mixture stirred for 10 minutes and then cooled to 25°–30° C. over 2 hours. The mixture was filtered and washed with distilled water until the filtrate no longer gave an alkaline test on Brilliant Yellow paper. The cake was washed with 100 parts of a 0.2% solution of oxalic acid in water and dried at 60° C. in a vacuum oven in a nitrogen atmosphere. A purified product, 40.3 parts (81% recovery), was obtained having a transmittance of 99%. The thermal stability of the purified product was good as shown by the fact that a sample heated at 100° C. for 16 hours had a transmittance of 97%.

In the above experiment, when 100 parts of a 0.1% solution of oxalic acid in water was used in place of the 0.2% oxalic acid solution, the sample when heated at 100° C. had a transmittance of 91%. If the oxalic acid wash was omitted, the sample heated at 100° C. had a transmittance of 86%. If the ethylenediamine tetraacetic acid tetrasodium salt was omitted and the product washed with 100 parts 0.1% oxalic acid solution, the sample heated at 100° C. had a transmittance of 85%.

EXAMPLE 8

A mixture of 150 parts crude DHBP (having a transmittance of 25%), 285 parts distilled water, 12 parts sodium carbonate and 1.5 parts "Versene" Fe No. 3 was heated to 96°–98° C. to give a clear solution. Then 15 parts sodium hydrosulfite was added and the mixture was held at 96°–98° C. for 10 minutes. The mixture was cooled to 25°–30° C., filtered and washed with distilled water until the filtrate was alkali free when tested on Brilliant Yellow paper. The cake was divided into 3 parts. The first third was dried, the second third was washed with 100 parts of a 0.2% solution of oxalic acid in water and dried, and the third part was washed with 100 parts of a 0.2% solution of citric acid in water and dried. The following table gives the transmittance of the dried samples.

|  | Optical transmittance after drying at— | |
|---|---|---|
|  | 60° C. | 100° C. |
| First third | 89 | 85 |
| Second third | 93 | 90 |
| Third third | 92 | 89 |

This experiment shows that washing with oxalic acid or citric acid gives a product with improved transmittance.

The above examples have shown the surprising improvement in purity and stability after treating crude 2,4-dihydroxybenzophenone with sodium hydrosulfite in alkaline medium.

The foregoing detailed description has been given for clearness of understanding only and no unnecessary limitations are to be understood therefrom. The invention is not limited to the exact details shown and described, for obvious modifications will occur to those skilled in the art.

What is claimed is:

1. A process for the removal of orange-red impurities from crude 2,4-dihydroxybenzophenone formed by reacting resorcinol with a compound selected from the group consisting of benzoyl chloride, benzonitrile and benzotrichloride which comprises dissolving said crude 2,4-dihydroxybenzophenone in an aqueous alkaline solution having a pH of at least about 7.5, heating said solution to at least about 70° C., adding to said solution at least about 0.05 part by weight of sodium hydrosulfite per part of said crude, maintaining said solution at from about 70° to 100° C. for at least about 10 minutes, precipitating said 2,4-dihydroxybenzophenone by cooling to about room temperature and recovering the purified 2,4-dihydroxybenzophenone by filtering, washing and drying.

2. Claim 1 further comprising, before drying, dissolving said precipitate in acetone, heating in the presence of activated carbon, filtering, reprecipitating said 2,4-dihydroxybenzophenone by drowning in water, filtering and washing.

3. Claim 1 further comprising adding to said hot aqueous alkaline solution at least about 0.01 part by weight per part of said 2,4-dihydroxybenzophenone of a metal sequestering agent selected from the group consisting of ethylenediamine tetraacetic acid tetrasodium salt and a mixture of ethylenediamine tetraacetic acid tetrasodium salt and the sodium salt of N,N-di(2-hydroxyethyl) glycine.

4. Claim 3 wherein said washing step consists of water-washing followed by washing with dilute aqueous solution of a lower aliphatic polybasic carboxylic acid.

5. Claim 4 wherein said acid is oxalic acid.

References Cited

UNITED STATES PATENTS

| 3,403,183 | 9/1968 | Dobratz et al. | 260—591 |
| 2,682,559 | 6/1954 | Stanley et al. | 260—591 |
| 2,921,962 | 1/1960 | Stanley | 260—591 |
| 3,387,035 | 6/1968 | Gray et al. | 260—591 |
| 2,854,485 | 9/1958 | Stanley | 260—591 |

FOREIGN PATENTS

| 278,325 | 1928 | Great Britain | 260—591 |

OTHER REFERENCES

Van Allen et al.: "J. Org. Chem.," vol. 19 (1954), pp. 1243 to 1251.

JOSEPH E. EVANS, Primary Examiner